United States Patent
Ikeda

(10) Patent No.: US 9,706,109 B2
(45) Date of Patent: Jul. 11, 2017

(54) IMAGING APPARATUS HAVING MULTIPLE IMAGING UNITS AND METHOD OF CONTROLLING THE SAME

(71) Applicant: CANON KABUSHIKI KAISHA, Tokyo (JP)

(72) Inventor: Hitoshi Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 14/580,021

(22) Filed: Dec. 22, 2014

(65) Prior Publication Data
US 2015/0189169 A1    Jul. 2, 2015

(30) Foreign Application Priority Data

Dec. 26, 2013  (JP) ................. 2013-269684

(51) Int. Cl.
| | |
|---|---|
| *H04N 5/225* | (2006.01) |
| *H04N 5/232* | (2006.01) |
| *H04N 5/262* | (2006.01) |

(52) U.S. Cl.
CPC ....... *H04N 5/23222* (2013.01); *H04N 5/2258* (2013.01); *H04N 5/23219* (2013.01); *H04N 5/23229* (2013.01); *H04N 5/23293* (2013.01); *H04N 5/2621* (2013.01)

(58) Field of Classification Search
CPC .................................................. H04N 5/272
USPC .......................................... 348/218.1, 333.05
See application file for complete search history.

(56) References Cited

U.S. PATENT DOCUMENTS

| | | | | |
|---|---|---|---|---|
| 2003/0117501 A1* | 6/2003 | Shirakawa | ........... | H04N 5/2251 348/218.1 |
| 2011/0249073 A1* | 10/2011 | Cranfill | ................. | H04N 7/147 348/14.02 |

FOREIGN PATENT DOCUMENTS

| | | |
|---|---|---|
| CN | 101547333 A | 9/2009 |
| CN | 101938623 A | 1/2011 |
| JP | 2013-017125 A | 1/2013 |

* cited by examiner

*Primary Examiner* — Joel Fosselman
(74) *Attorney, Agent, or Firm* — Canon USA, Inc. IP Division

(57) ABSTRACT

An imaging apparatus includes a first imaging unit, a second imaging unit, an orientation detection unit configured to detect an orientation of the imaging apparatus, a combining unit configured to superimpose an image captured by the second imaging unit on an image captured by the first imaging unit, and a control unit configured to control a position combining the image captured by the second imaging unit with the image captured by the first imaging unit. The control unit changes the combining position according to the orientation of the imaging apparatus that is detected by the orientation detection unit.

10 Claims, 8 Drawing Sheets

FIG.5

| | LIVE VIEW DISPLAY | MAIN CAPTURED IMAGE | SUB-CAPTURED IMAGE | MOVING IMAGE DATA | STILL IMAGE DATA |
|---|---|---|---|---|---|
| PORTRAIT ORIENTATION | 150 | | | 153 | |
| PORTRAIT POSITION (90 DEGREES RIGHTWARD) | 151 | | | 154 | |
| PORTRAIT POSITION (90 DEGREES LEFTWARD) | 152 | | | 155 | |

FIG.7

| | LIVE VIEW DISPLAY | MOVING IMAGE DATA |
|---|---|---|
| LANDSCAPE POSITION | 201, 205, 202, 203, 204 | 216, 217, 218, 219 |
| PORTRAIT POSITION (90 DEGREES RIGHTWARD) | 206, 207, 210, 208, 209 | 220, 221, 222, 223 |
| PORTRAIT POSITION (90 DEGREES LEFTWARD) | 211, 212, 215, 213, 214 | 224, 225, 226, 227 |

IMAGING APPARATUS HAVING MULTIPLE IMAGING UNITS AND METHOD OF CONTROLLING THE SAME

BACKGROUND

Technical Field

The present disclosure relates to an imaging apparatus including a plurality of imaging units and a method of controlling the same.

Description of the Related Art

In recent years, there have been cameras and mobile phones that include not only a main imaging system (lens, image sensor, etc.) for capturing an image of an object but also a sub-imaging system that is, for example, capable of capturing an image in photographer direction opposite to an object shooting direction. Images are simultaneously captured by the two imaging systems and then superimposed (combined) so that the countenance of the photographer can also be recorded at the same time.

There have been discussed an imaging apparatus configured to capture images using two imaging systems simultaneously and superimpose (combine) the captured images, and the imaging apparatus is ingeniously devised in terms of the superimposing position. Japanese Patent Application Laid-Open No. 2013-17125 discusses a digital camera including multiple imaging units in which a first image captured by one imaging unit is displayed on a full screen of a liquid crystal monitor screen while a second image captured by another imaging unit is displayed on a child screen within the full screen. Japanese Patent Application Laid-Open No. 2013-17125 discusses an arrangement of the child screen such that the child screen does not overlap a main object area (face-detected area) of the first image.

This conventional technique, however, does not discuss a process of determining the position of the child screen according to the orientation of the imaging apparatus.

SUMMARY

The present disclosure has been made in consideration of the aforementioned problems, and realizes an arrangement in which the orientation of an imaging apparatus is taken into consideration when an image captured by one imaging unit is combined with an image captured by another imaging unit.

In order to solve the aforementioned problems, the present disclosure provides an imaging apparatus including a first imaging unit, a second imaging unit, an orientation detection unit configured to detect an orientation of the imaging apparatus, a combining unit configured to combine an image captured by the second imaging unit with an image captured by the first imaging unit, and a control unit configured to control a position combining the image captured by the second imaging unit with the image captured by the first imaging unit, wherein the control unit changes the combining position according to the orientation of the imaging apparatus that is detected by the orientation detection unit.

In order to solve the aforementioned problems, the present disclosure provides a method of controlling an imaging apparatus including a first imaging unit and a second imaging unit includes determining an orientation of the imaging apparatus, and combining an image captured by the second imaging unit with an image captured by the first imaging unit, wherein in the combining, a position combining the image captured by the second imaging unit with the image captured by the first imaging unit is controlled according to the orientation of the imaging apparatus that is determined in the determining.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates examples of a live view display screen, a main captured image, a sub-captured image, moving image data, and still image data in landscape orientation shooting and portrait orientation shooting.

FIG. 7 illustrates examples of the superimposing position of a sub-image on live view displays and recorded moving images in landscape orientation shooting and portrait orientation shooting.

DESCRIPTION OF THE EMBODIMENTS

Various exemplary embodiments, features, and aspects of the invention will be described in detail below with reference to the drawings.

The following describes first exemplary embodiments of the present invention with reference to the drawings.

Figure 1:
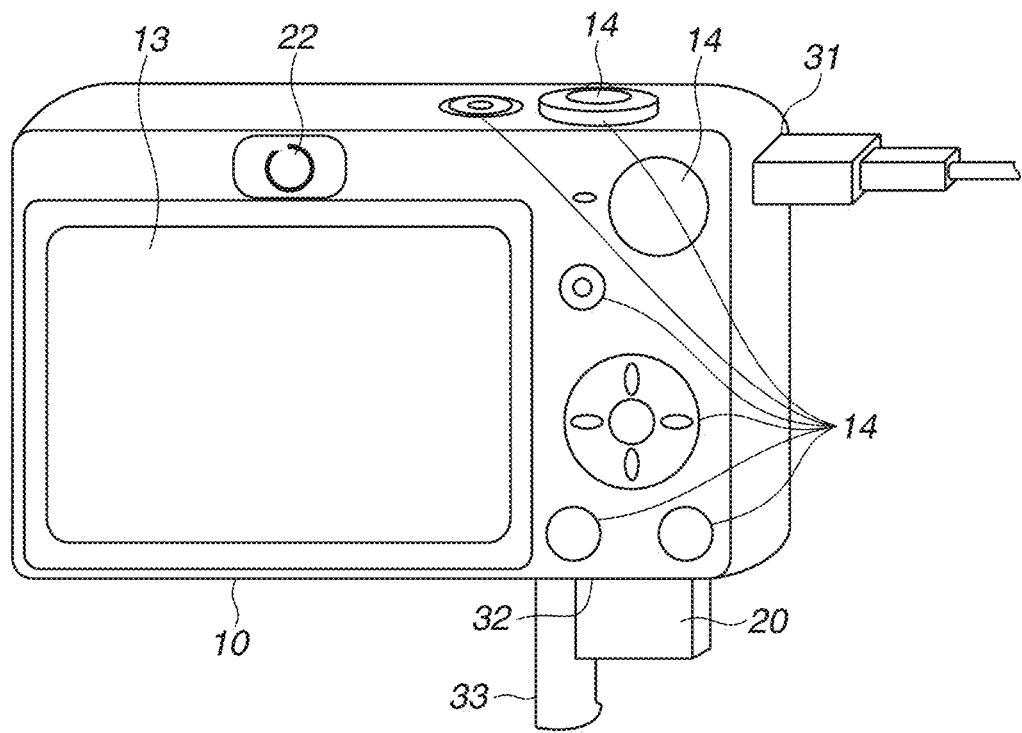
FIG. 1 is an external view illustrating an imaging apparatus.
Figure 2:
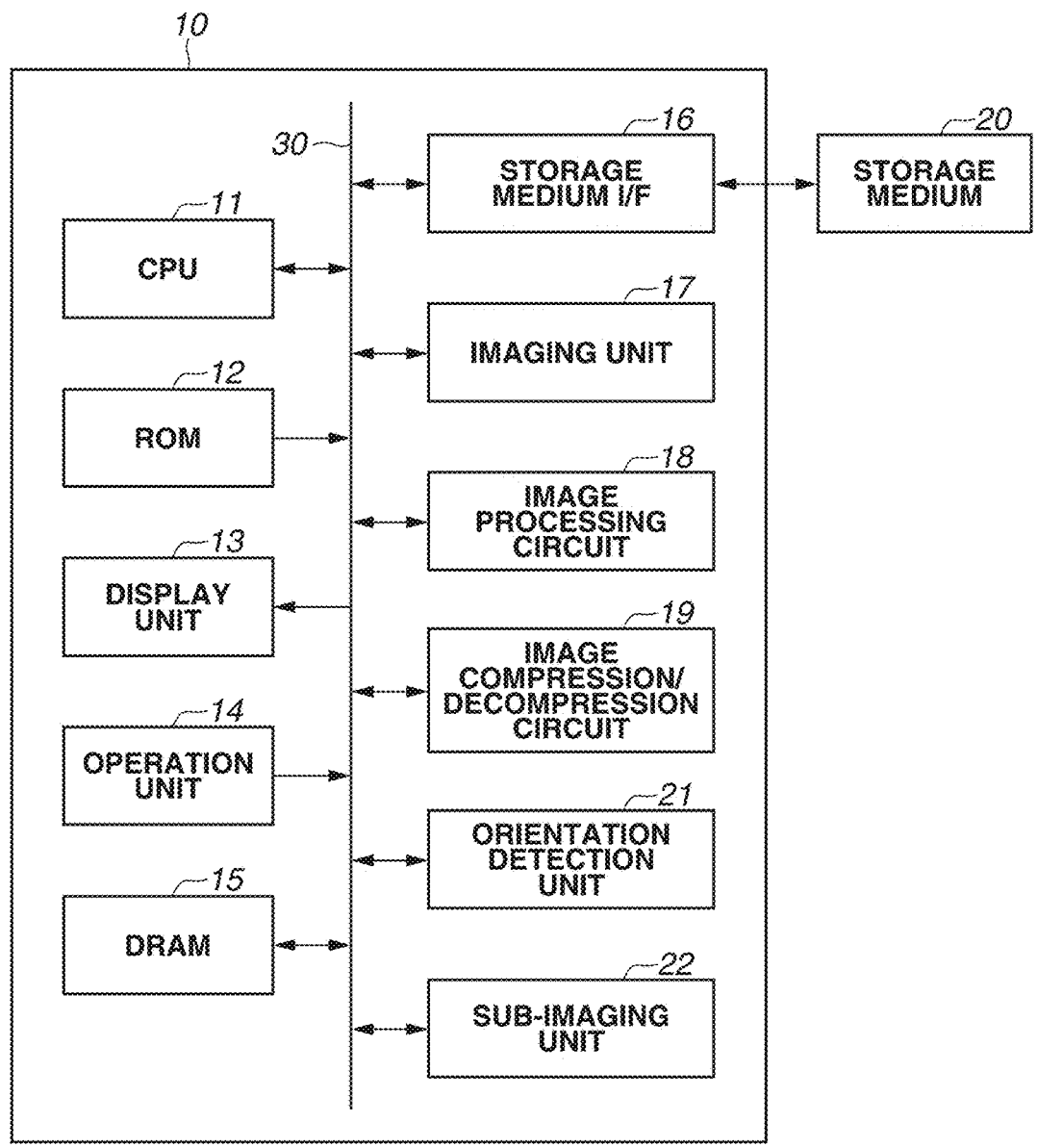
FIG. 2 is a schematic configuration block diagram illustrating an imaging apparatus.

FIG. 1 is an exterior view of an imaging apparatus according to a first exemplary embodiment of the present invention. FIG. 2 is a schematic configuration block diagram of the imaging apparatus.

A connector 31 is a connector configured to connect a connection cable such as a universal serial bus (USB) and an imaging apparatus 10 together. A recording medium 20 is a medium such as a memory card or a hard disk. A recording medium slot 32 is a slot into which the recording medium 20 is to be inserted. The recording medium 20 inserted in the recording medium slot 32 is capable of communicating with the imaging apparatus 10. A cover 33 is a cover of the recording medium slot 32. Images captured by the imaging apparatus 10 are recorded in the recording medium 20.

A central processing unit (CPU) 11 is a control unit configured to control each processing unit described below, data flow, and the like. A read-only memory (ROM) 12 is a nonvolatile memory configured to store programs (firmware) that relate to the processing of the CPU 11 and various types of information.

A display unit 13 includes a color liquid crystal display and the like. The display unit 13 is used to display captured images and graphic user interfaces. The display unit 13 further includes terminals for outputting video signals to an external display device such as a television (TV). The CPU 11 of the imaging apparatus 10 may control the display such that the external display device displays captured images and graphic user interfaces.

An operation unit 14 is configured to receive user commands. The operation unit 14 includes various types of buttons, arrow keys, a joystick, a dial switch, etc. The various types of buttons include a power button, a shutter button, a moving image shooting button, etc. The CPU 11 performs control such that in response to a user command received by the operation unit 14, the corresponding processing is performed. The operation unit 14 may be a touch panel provided to the display unit 13.

A dynamic random-access memory (DRAM) 15 is used as a work area of the CPU 11. The DRAM 15 has a buffer function to temporarily store image data, data to be displayed, compressed image data, etc. In general, the CPU 11 writes or read data via a memory controller provided between the CPU 11 and the DRAM 15, although the memory controller is not illustrated. Further, although not illustrated, a direct memory access (DMA) controller is provided between each processing unit and the DRAM 15 to conduct DMA transfer without read/write operations of the CPU 11.

A recording medium interface 16 controls the recording to write or read image data to or from the recording medium 20 according to a command from the CPU 11. The recording medium 20 includes a random-accessible recording medium such as a memory card, an optical disk, or a hard disk. The recording medium 20 is removable from the imaging apparatus 10. The CPU 11, the DRAM 15, and the recording medium interface 16 record captured still and moving images in the recording medium 20.

An imaging unit 17 includes a lens, a diaphragm, a shutter, and an image sensor such as a charge-coupled device (CCD) sensor or a complementary metal-oxide-semiconductor (CMOS) sensor. The imaging unit 17 is a main camera for capturing an image on a front surface side of the imaging apparatus 10, i.e., object side. Hereinafter, an image captured by the imaging unit 17 will be referred to as a main image or a main captured image, and a moving image captured by the imaging unit 17 will be referred to as a main moving image. An image processing circuit 18 executes processing such as white balance adjustment and pixel interpolation on image data read from the imaging unit 17 to convert the image data into YUV data. The image processing circuit 18 also resizes YUV data that is to be compressed by an image compression/decompression circuit 19 or decompressed YUV data to an arbitrary size, rotates the data, and/or executes color conversion on the data.

The image compression/decompression circuit 19 executes compression processing to compress YUV data into Joint Photographic Experts Group (JPEG)-format still image data or H.264-format moving image data. The image compression/decompression circuit 19 also executes decompression processing to decompress JPEG or H.264-format compressed image data into YUV data. In a case where the imaging unit 17 or a sub-imaging unit 22 captures a still image, the image compression/decompression circuit 19 compresses the still image into still image data. In a case where the imaging unit 17 or the sub-imaging unit 22 captures a moving image, the image compression/decompression circuit 19 compresses the moving image into moving image data. When an image recorded in the recording medium 20 is to be displayed on the display unit 13, the image compression/decompression circuit 19 decompresses compressed still or moving image data read from the recording medium 20. The display unit 13 displays the image based on the decompressed data.

An orientation detection unit 21 includes an inclination sensor, a gyroscope, or the like. The orientation detection unit 21 detects the orientation of the imaging apparatus 10, more specifically the orientation of the imaging unit 17, i.e., the angle of rotation of the imaging apparatus 10 about an optical axis. From the angle of rotation, the orientation detection unit 21 determines whether the imaging apparatus 10 is in landscape or portrait orientation, thereby detecting the orientation of the imaging apparatus 10. In a case where the imaging apparatus 10 is rotated about the optical axis by 90 or 270 degrees (−90 degrees), the orientation detection unit 21 determines that the imaging apparatus 10 is in portrait orientation. On the other hand, in a case where the imaging apparatus 10 is not rotated about the optical axis or is rotated about the optical axis by 180 degrees, the orientation detection unit 21 determines that the imaging apparatus 10 is in landscape orientation.

The sub-imaging unit 22 includes a lens, an image sensor such as a CCD sensor or a CMOS sensor, and an image processing circuit. The image processing circuit executes processing such as white balance adjustment and pixel interpolation on image data read from the image sensor to convert the image data into YUV data, and outputs the YUV data. The imaging unit 17 and the sub-imaging unit 22 may share the image processing circuit 18. The sub-imaging unit 22 is a sub-camera provided on the front surface side of the imaging apparatus 10, i.e., photographer side to capture an image of a photographer or a person watching an image displayed on the display unit 13. The shooting directions (optical axis) of the main camera and the sub-camera are parallel to each other and directed in opposite directions. Hereinafter, an image captured by the sub-imaging unit 22 will be referred to as a sub-image or a sub-captured image, and a moving image captured by the sub-imaging unit 22 will be referred to as a sub-moving image.

The CPU 11, the ROM 12, the display unit 13, the operation unit 14, the DRAM 15, the recording medium interface (I/F) 16, the imaging unit 17, the image processing circuit 18, the image compression/decompression circuit 19, the orientation detection unit 21, and the sub-imaging unit 22 communicate with one another via an internal bus 30.

Normally, when the shutter button of the operation unit 14 is pressed, the imaging unit 17 captures a still image. The captured still image is processed by the image processing circuit 18 and the image compression/decompression circuit 19 to obtain still image data, and the recording medium interface 16 records the still image data in the recording medium 20. Further, when the moving image shooting button of the operation unit 14 is pressed, the imaging unit 17 captures a moving image. The captured moving image is processed by the image processing circuit 18 and the image compression/decompression circuit 19 to obtain moving image data, and the recording medium interface 16 records the moving image data in the recording medium 20. Further, while the imaging apparatus 10 is on standby for shooting or is capturing a moving image, images captured by the imaging unit 17 are sequentially displayed as a live view display on the display unit 13.

The imaging apparatus 10 according to the present exemplary embodiment has a simultaneous recording and shooting mode. In the simultaneous recording and shooting mode, when the shutter button is pressed to give a still image shooting command, a still image is captured by the imaging unit 17 and recorded in the recording medium, and a moving image captured by the imaging unit 17 before the still image shooting command is given is recorded in the recording medium. In the simultaneous recording and shooting mode, the moving image of a predetermined period that is captured by the imaging unit 17 is temporarily stored during the still image shooting standby. The moving image of the predetermined period that was captured prior to the still image shooting by the imaging unit 17 can be associated with the captured still images and then recorded. At this time, the moving image may be rotated and then recorded so that regardless of whether the orientation of the imaging apparatus 10 during the shooting was landscape or portrait, the captured moving image is always reproduced with the up side up no matter how a reproduction apparatus is positioned. Specifically, the moving image is rotated according to the rotation angle detected by the orientation detection unit 21 and then recorded. Furthermore, a still image and a moving image can be captured at different aspect ratios. While an angle of view of an aspect ratio for still image shooting (e.g., 4:3) is displayed as a live view display on the display unit 13, a moving image can be recorded at an angle of view of a different aspect ratio (e.g., high definition (HD) moving image 16:9). Specifically, in the landscape orientation shooting, data to be displayed is generated from a captured image of an entire imaging area and displayed as a live view display, while a moving image is clipped at an aspect ratio for moving image recording and recorded in a preset recording image size. On the other hand, in portrait orientation shooting, a captured image of the entire imaging area is rotated by 90 degrees and resized without being clipped at a recording aspect ratio. Then, a margin image (in general, black image) is added to each of the right and left sides of the rotated and resized image, and then the image is recorded as a moving image having a landscape aspect ratio. As used herein, the term "entire imaging area" refers to an entire area of an image captured by the imaging unit 17. Alternatively, the entire imaging area may be an effective area of an image captured by the imaging unit 17 that is used in recording and displaying. Further, while the margin image is added to each of the right and left sides in the present exemplary embodiment, there may be cases where the margin image is added to each of the upper and bottom sides, depending on the recording image size and the shooting image size. In other words, the margin image is added to an external side of each of two opposite sides of an image captured by the imaging unit 17. Further, while black data is added as the margin image in the present exemplary embodiment, the data to be added as the margin image is not limited to black data, and white data or preset image data may be added as the margin image.

Furthermore, in the simultaneous recording and shooting mode, a picture-in-picture (PinP) image in which a photographer image captured by the sub-imaging unit 22 attached to the rear surface of the imaging apparatus 10 is superimposed on an object image captured by the imaging unit 17 can be displayed as a live view display and recorded as a moving image.

Figure 3:
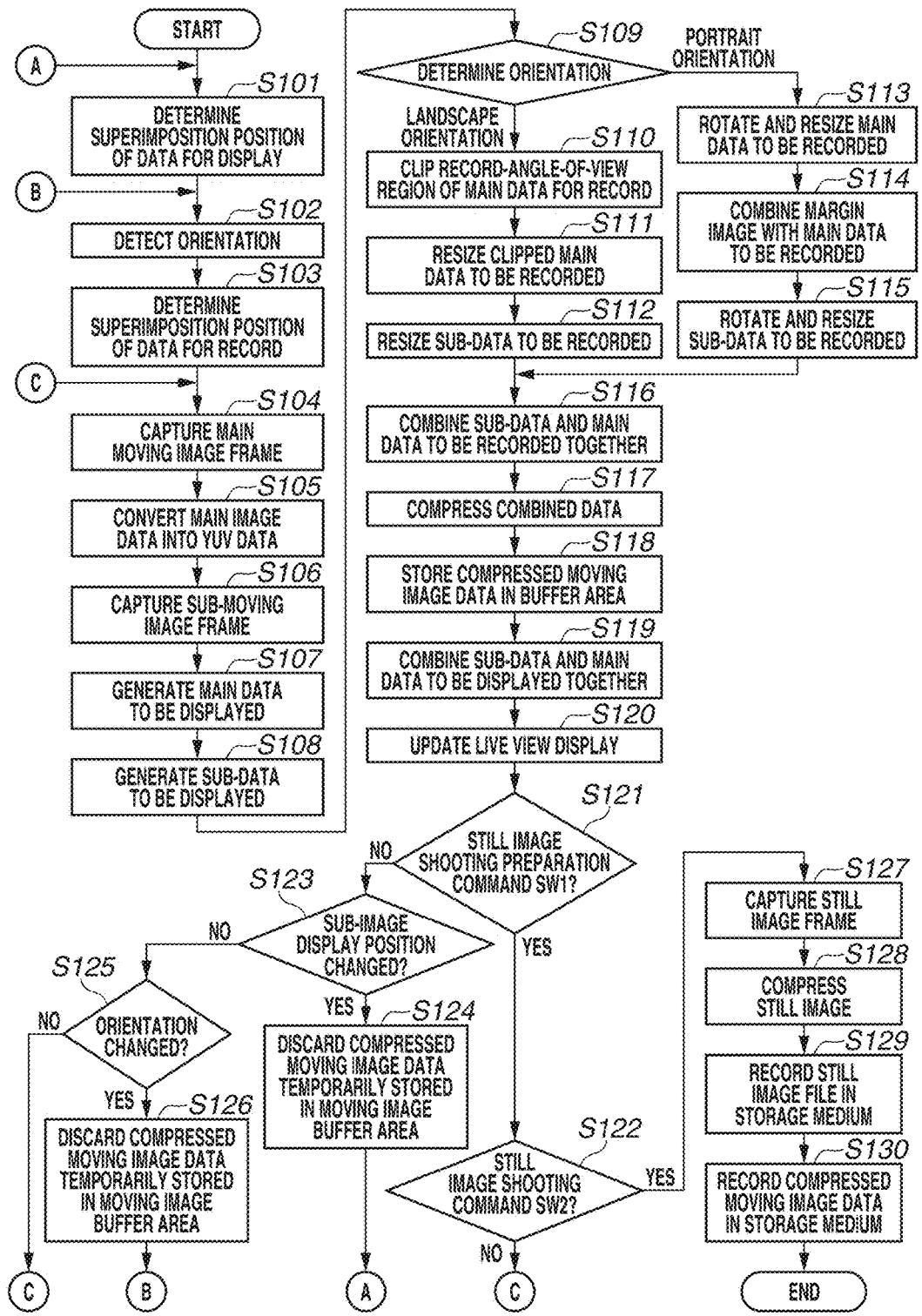
FIG. 3 is a flow chart illustrating the processing of an imaging apparatus in a simultaneous recording and shooting mode according to a first exemplary embodiment.
Figure 4:
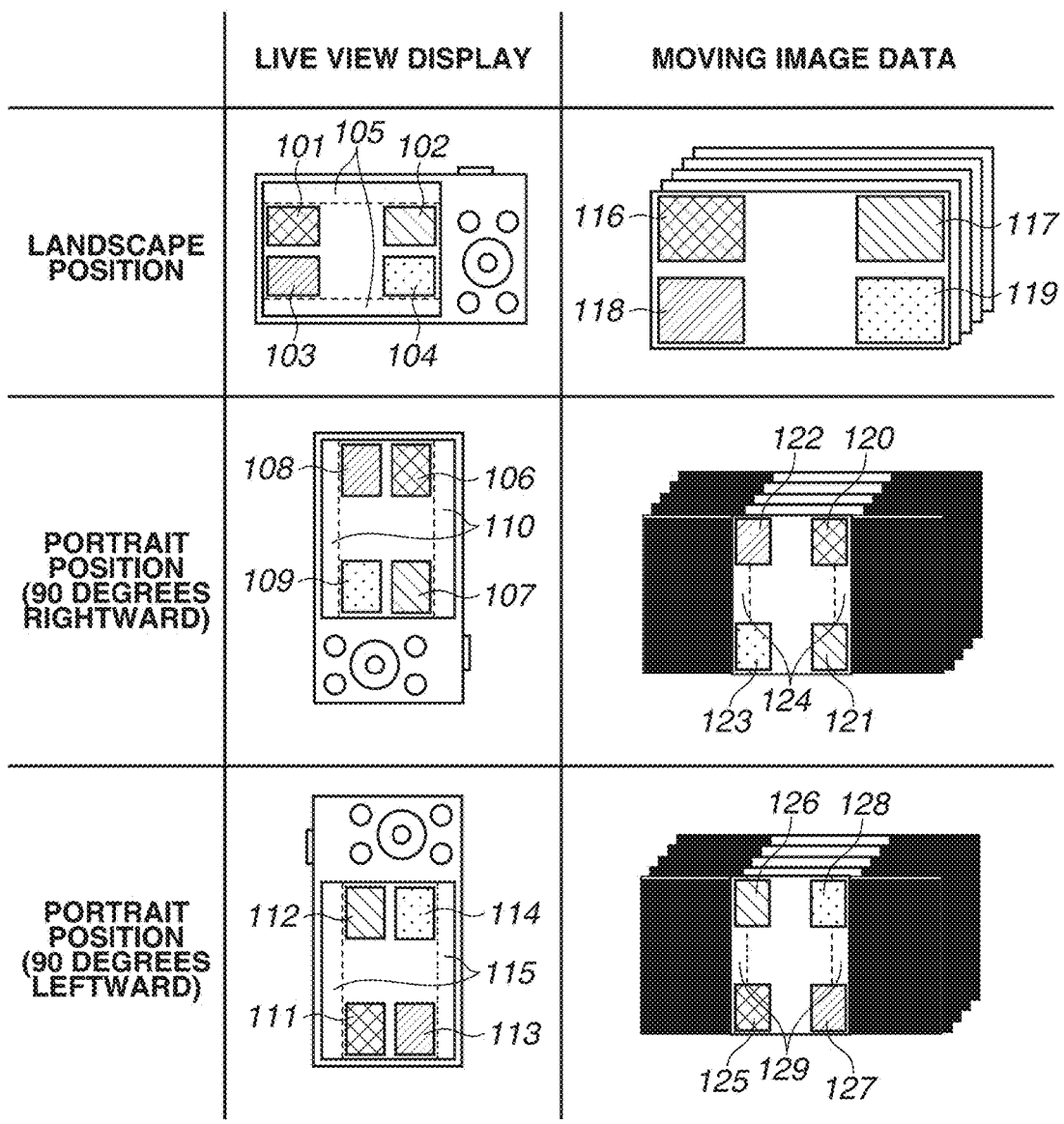
FIG. 4 illustrates examples of the superimposing position of a sub-image on live view displays and recorded moving images in landscape orientation shooting and portrait orientation shooting.

FIG. 3 is a flow chart illustrating operations of a shooting process that is executed by the imaging apparatus 10 in the simultaneous recording and shooting mode. The CPU 11 controls the respective units according to programs read from the ROM 12 to realize the operations illustrated in FIG. 3. FIG. 4 illustrates examples of the superimposing position of a sub-image on live view displays and moving images in landscape orientation shooting and portrait orientation shooting (90 degrees rightward/90 degrees leftward). FIG. 5 illustrates examples of a main captured image, a sub-captured image, a live view display screen, moving image data, and still image data in landscape orientation shooting and portrait orientation shooting (90 degrees rightward/90 degrees leftward).

When a photographer operates the mode dial of the operation unit 14 to set the imaging apparatus 10 to the simultaneous recording and shooting mode, the flow illustrated in FIG. 3 is started.

In step S101, the CPU 11 determines the superimposing position (combining position) of sub-data to be displayed which is generated from a sub-captured image captured by the sub-imaging unit 22, on main data to be displayed which is generated from a main captured image captured by the imaging unit 17, at the time of displaying a live view display on the display unit 13. In the present exemplary embodiment, the superimposing position of data to be displayed is determined based solely on the settings of the imaging apparatus 10 (settings of sub-image display position) and does not depend on the orientation of the imaging apparatus 10. In other words, the superimposing position does not depend on whether the shooting is landscape or portrait orientation shooting.

In step S102, the CPU 11 detects the orientation of the imaging apparatus 10 by use of the orientation detection unit 21 and stores in the DRAM 15 the information about the detected current orientation of the imaging apparatus 10.

In step S103, the CPU 11 determines the superimposing position (combining position) of sub-data to be recorded which is generated from an image captured by the sub-imaging unit 22, on main data to be recorded which is generated from an image captured by the imaging unit 17, in the moving image recording. In the present exemplary embodiment, the superimposing position is determined based on the settings (settings of sub-image display position) of the imaging apparatus 10 and the orientation of the imaging apparatus that is detected in step S102 and stored in the DRAM 15. In the case of landscape orientation shooting, an area defined by clipping upper and lower end portion areas of the entire captured main image data (entire imaging area) is recorded. On the other hand, in the case of portrait orientation shooting, the entire main image data (entire imaging area) is recorded. That is because the sub-image is not likely to cover an object if it is superimposed on an end portion of image data. Thus, the sub-image is superimposed on an end portion of an area of the main image to be recorded. Accordingly, the superimposing position of the sub-image on the main image of the data to be recorded is changed depending on the orientation of the imaging apparatus 10, i.e., depending on whether the shooting is landscape or portrait orientation shooting.

The following describes in detail the superimposing position (superimposing and display position) of the sub-image on live view displays and the superimposing position (superimposing and recording position) of the sub-image on moving images in landscape orientation shooting and portrait orientation shooting (90 degrees rightward/90 degrees leftward) according to the present exemplary embodiment, with reference to FIG. 4. Dotted lines in the live view display and the moving images are merely for description and are not displayed or recorded in the moving images.

In the simultaneous recording and shooting mode according to the present exemplary embodiment, the superimposing position of the sub-image on the live view display can be selected from the upper left 101, the upper right 102, the lower left 103, and the lower right 104 of the display unit 13 of the imaging apparatus 10 in normal position, i.e., landscape orientation. In the simultaneous recording and shooting mode, the imaging apparatus 10 captures a still image at the press of the shutter button, and the display unit 13 displays as a live view display, the still image with an angle of view at an aspect ratio of 4:3. While the still image with the angle of view at the aspect ratio of 4:3 is displayed as a live view display, a HD moving image with an angle of view at an aspect ratio of 16:9 that is obtained by clipping upper and lower end portion areas of the image displayed as the live view display can be recorded together with the still image. Further, in the simultaneous recording and shooting mode, the sub-image is superimposed on the moving image to be recorded, whereas no sub-image is superimposed on the still image to be recorded and only the main image is recorded. For this reason, the sub-image is positioned within an inner area excluding upper and lower end portion areas 105, which are defined by the dotted lines and are not to be recorded in the moving image. In other words, the sub-image is positioned within an area of the shooting area on the live view display that is to be recorded as the moving image. Since the superimposing and display position of the sub-image is not changed according to the orientation of the imaging apparatus 10 in the present exemplary embodiment, even when the imaging apparatus 10 is changed to portrait orientation, the superimposing and display position of the sub-image on the display unit 13 does not change. That is to say, in the case where the imaging apparatus 10 is rotated rightward by 90 degrees, the superimposing and display position of the sub-image is a position 106 in the case where the superimposing and display position on the display unit 13 of the imaging apparatus 10 in landscape orientation is the upper left 101, a position 107 in the case where the superimposing and display position on the display unit 13 of the imaging apparatus 10 in landscape orientation is the upper right 102, a position 108 in the case where the superimposing and display position on the display unit 13 of the imaging apparatus 10 in landscape orientation is the lower left 103, or a position 109 in the case where the superimposing and display position on the display unit 13 of the imaging apparatus 10 in landscape orientation is the lower right 104. On the other hand, in the case where the imaging apparatus 10 is rotated leftward by 90 degrees, the superimposing and display position is a position 111 in the case where the superimposing and display position on the display unit 13 of the imaging apparatus 10 in landscape orientation is the upper left 101, a position 112 in the case where the superimposing and display position on the display unit 13 of the imaging apparatus 10 in landscape orientation is the upper right 102, a position 113 in the case where the superimposing and display position on the display unit 13 of the imaging apparatus 10 in landscape orientation is the lower left 103, or a position 114 in the case where the superimposing and display position on the display unit 13 of the imaging apparatus 10 in landscape orientation is the lower right 104.

On the other hand, the superimposing position of the sub-image on the moving image to be recorded is changed according to the orientation of the imaging apparatus 10.

In the case where the imaging apparatus 10 is in landscape orientation, the sub-image is superimposed on the same position as the superimposing position on the live view display. The sub-image is superimposed on a position 116 and recorded if the superimposing and display position on the live view display in landscape orientation is the upper left 101. a position 117 if the superimposing and display position on the live view display in landscape orientation is the upper right 102. The sub-image is superimposed and recorded on a position 118 if the superimposing and display position on the live view display in landscape orientation is the lower left 103. The sub-image is superimposed and recorded on a position 119 if the superimposing and display position on the live view display in landscape orientation is the lower right 104.

In portrait orientation shooting, the sub-image is superimposed on a position far from the upper and lower end portions of the main image on the live view display, whereas the sub-image is positioned at the upper or lower end portion of an area of the main image that is not to be recorded in the recorded moving image. This is because the upper and lower end portion areas 105 on the live view display are not recorded in the recorded moving image, but the sub-image is superimposed such that the superimposing position of the sub-image on the main image on the live view display is substantially the same as that on the recorded moving image.

In the case where the imaging apparatus 10 is changed to portrait orientation, the captured image is rotated by 90 degrees and resized without being clipped. Then, a margin image is added to each of the right and left sides of the captured image, and then the image is recorded as a moving image. Since the superimposing and display position is not changed according to the orientation of the imaging apparatus 10, areas 110 and 115, which are not to be recorded in the recorded moving image in the case where the imaging apparatus 10 is in landscape orientation, are recorded in the recorded moving image when the imaging apparatus 10 is in portrait orientation, but the superimposing and display position on the live view display is set within an inner area to avoid the end portion area 110 or 115. On the other hand, end portion areas 124 and 129, which are not to be recorded in the recorded moving image in the case where the imaging apparatus 10 is in landscape orientation, are recorded in the recorded moving image when the imaging apparatus 10 is in portrait orientation. Thus, the superimposing and recording position are set within an area including the end portion area 124 or 129, each of which is an end of the main image and is not recorded in landscape orientation shooting. In other words, when the imaging apparatus 10 is rotated rightward by 90 degrees, the sub-image is superimposed on a position 120 and recorded in the case where the superimposing and display position is the position 106. The sub-image is superimposed and recorded on a position 121 in the case where the superimposing and display position is the position 107. The sub-image is superimposed and recorded on a position 122 in the case where the superimposing and display position is the position 108. The sub-image is superimposed and recorded on a position 123 in the case where the superimposing and display position is the position 109. On the other hand, when the imaging apparatus 10 is rotated leftward by 90 degrees, the sub-image is superimposed on a position 125 and recorded in the case where the superimposing and display position is the position 111. The sub-image is superimposed and recorded on a position 126 in the case where the superimposing and display position is the position 112. The sub-image is superimposed and recorded on a position 127 in the case where the superimposing and display position is the position 113. The sub-image is superimposed and recorded on a position 128 in the case where the superimposing and display position is the position 114. As the foregoing describes, in the present exemplary embodiment, in the case where the imaging apparatus 10 is in portrait orientation, the sub-image is superimposed on the main image such that the superimposing position of the sub-image on the live view display is different from that on the recorded moving image.

In the foregoing way, the superimposing position of the data to be displayed for the live view display and the superimposing position of the data to be recorded for the moving image recording are determined in steps S101 and S103, respectively.

In step S104, the CPU 11 captures a main moving image frame captured by the imaging unit 17.

In step S105, the CPU 11 causes the image processing circuit 18 to perform processing such as white balance adjustment and pixel interpolation on the main image data captured in step S104, converts the processed data into YUV data, and writes the YUV data to the DRAM 15. At this time, regardless of the orientation of the imaging apparatus 10, the YUV data having an aspect ratio 4:3 is generated directly from the imaging area having an aspect ratio of 4:3.

In step S106, the CPU 11 captures a sub-moving image frame captured by the sub-imaging unit 22. In this step, the CPU 11 causes the image processing circuit 18 to perform processing such as white balance adjustment and pixel interpolation on the captured sub-image data, converts the processed data into YUV data, and writes the YUV data to the DRAM 15.

In step S107, the CPU 11 causes the image processing circuit 18 to generate main data to be displayed as a live view display on the display unit 13 from the main YUV data generated in step S105, and the CPU 11 writes the main data to be displayed to the DRAM 15. In this step, the image processing circuit 18 executes on the YUV data the processing to resize the YUV data to a display data size, the processing to combine margin images so that the aspect ratio becomes the same as the aspect ratio of the display unit 13, and the like. The CPU 11 controls the resizing processing and the margin image combining processing of the image processing circuit 18 such that the entire main YUV data generated in step S105 is displayed on the display unit 13 regardless of the orientation of the imaging apparatus 10.

In step S108, the CPU 11 causes the image processing circuit 18 to generate sub-data to be displayed on the display unit 13 as a live view display from the sub-YUV data captured in step S106, and the CPU 11 writes the sub-data to be displayed to the DRAM 15. In this step, the image processing circuit 18 executes resizing processing on the YUV data to resize the YUV data to the display data size.

In step S109, the CPU 11 acquires information stored in the DRAM 15 about the orientation of the imaging apparatus 10 and then determines whether the orientation of the imaging apparatus 10 at the time of the start of the moving image buffering is landscape or portrait orientation.

In step S109, if the orientation of the imaging apparatus 10 at the time of the start of the moving image buffering is landscape orientation, then in step S110, the CPU 11 controls the image processing circuit 18 to clip a moving image recording angle-of-view area from the generated main YUV data. In other words, the image processing circuit 18 clips the area to be recorded as a moving image excluding the upper and lower end portion areas 105, which is described above with reference to FIG. 4. The moving image recording angle-of-view area may be clipped by reading the entire main YUV data generated in step S105 and then applying a window function of the image processing circuit 18 or by reading only the moving image recording angle-of-view area. In this way, the main moving image recording angle-of-view area having an aspect ratio of 16:9 is clipped from the main YUV data having an aspect ratio of 4:3.

In step S111, the CPU 11 causes the image processing circuit 18 to resize the main YUV data with the moving image recording angle-of-view that is clipped in step S110 to a moving image recording size, thereby generating main data to be recorded as a moving image.

In step S112, the CPU 11 causes the image processing circuit 18 to resize the sub-YUV data captured in step S106 to the moving image recording size, thereby generating sub-data to be recorded as a moving image.

On the other hand, in the case where the orientation of the imaging apparatus 10 at the time of the start of the moving image buffering is portrait orientation, in step S113, the CPU 11 causes the image processing circuit 18 to execute rotating processing to rotate by 90 degrees the main YUV data generated in step S105. Then, the CPU 11 resizes main YUV data rotated by the image processing circuit 18 such that the length of the longer side of the main YUV data is resized to the length of the shorter side of the moving image recording size while the ratio between the loner and shorter sides is maintained. Specifically, in a case where the moving image recording size is HD (1280×720 pixels), the image data is resized to 540×720 pixels so that the length of the longer side of the image data becomes 720.

In step S114, the CPU 11 controls the image processing circuit 18 to combine a predetermined image showing a margin such as a black image with each of the right and left sides of the resized image such that the size of the entire image becomes the moving image recording size. Specifically, in the case where the moving image recording size is HD (1280×720 pixels), a black image of 370×720 pixels is added to each of the right and left sides of the image data of 540×720 pixels, whereby image data with 1280×720 pixels to be compressed is generated in total.

In step S115, the CPU 11 causes the image processing circuit 18 to execute rotation processing to rotate by 90 degrees the sub-YUV data generated in step S106, and the CPU 11 resizes the rotated data to the sub-moving image recording size while the ratio between the longer and shorter sides is maintained, thereby generating sub-data to be recorded as a moving image.

Once the main data and sub-data to be recorded as a moving image are generated, in step S116, the CPU 11 causes the image processing circuit 18 to combine the sub-data for recording with the main data for recording according to the superimposing position (superimposing and recording position) of data to be recorded that is determined in step S103.

In step S117, the CPU 11 causes the image compression/decompression circuit 19 to compress the superimposed data for recording, which is generated in step S116 by combining the sub-image with the main image, using a moving image compression method such as a Moving Picture Experts Group (MPEG) method or motion JPEG method.

In step S118, the CPU 11 temporarily stores the moving image data compressed in step S117 in a moving image buffer area on the DRAM 15.

Once the main data and sub-data to be displayed are generated, in step S119, the CPU 11 causes the image processing circuit 18 to combine the sub-data for display with the main data for display according to the superimposing position (superimposing and display position) of data to be displayed that is determined in step S101.

In step S120, the CPU 11 displays on the display unit 13 the superimposed data for display that is generated in step S119 by combining the sub-image with the main image. In other words, the live view display on the display unit 13 is updated.

In step S121, the CPU 11 determines whether the user performs a half-pressing operation (SW1) of the shutter button (release switch) of the operation unit 14. That is to say, the CPU 11 determines whether the user inputs a still image shooting preparation command. In step S121, if the CPU 11 determines that no still image shooting preparation command (SW1) is input (NO in step S121), the processing proceeds to step S123. In step S123, the CPU 11 determines whether the user operates the operation unit 14 or touches and operates the display unit 13 to input a command to change the display position of the sub-image. In step S123, if the CPU 11 determines that a command to change the display position of the sub-image is input (YES in step S123), then in step S124, the CPU 11 temporarily stops the moving image buffering and discards the compressed moving image data that is temporarily stored in the moving image buffer area on the DRAM 15. Then, the processing returns to step S101, and the CPU 11 continues the processing on the next frame. On the other hand, in step S123, if the CPU 11 determines that no command to change the display position of the sub-image is input (NO in step S123), the processing proceeds to step S125.

In step S125, the CPU 11 compares the information about the orientation of the imaging apparatus 10 that is stored in the DRAM 15 with the current orientation of the imaging apparatus 10 that is detected by the orientation detection unit 21, and the CPU 11 determines whether the orientation of the imaging apparatus 10 is changed. In step S125, if the CPU 11 determines that the orientation of the imaging apparatus 10 is changed (YES in step S125), then in step S126, the CPU 11 temporarily stops the moving image buffering and discards the compressed moving image data that is temporarily stored in the moving image buffer area on the DRAM 15. Then, the processing returns to step S102, and the CPU 11 continues the processing on the next frame. On the other hand, in step S125, if the CPU 11 determines that the orientation of the imaging apparatus 10 is not changed (NO in step S125), the processing returns to step S104, and the CPU 11 continues the processing on the next frame.

On the other hand, in step S121, if the CPU 11 determines that the user inputs a still image shooting preparation command (SW1) (YES in step S121), the CPU 11 executes the still image shooting preparation processing (focus control, exposure control, etc. on the imaging unit 17). In step S122, the CPU 11 determines whether the user performs a full-press operation (SW2) on the shutter button (release switch) of the operation unit 14. That is to say, the CPU 11 determines whether the user inputs a still image shooting command.

In step S122, if the CPU 11 determines that no still image shooting command (SW2) is input (NO in step S122), the processing returns to step S104, and the CPU 11 continues the processing on the next frame.

On the other hand, in step S122, if the CPU 11 determines that the user inputs a still image shooting command (YES in step S122), then in step S127, the CPU 11 stops the moving image buffering and causes the imaging unit 17 to capture the still image frame.

In step S128, the CPU 11 causes the image processing circuit 18 to convert the image data of the still image frame captured in step S127 into YUV data and then causes the image compression/decompression circuit 19 to compress the YUV data in JPEG format.

In step S129, the CPU 11 records the acquired still image file in the recording medium 20 via the recording medium interface 16.

In step S130, the CPU 11 records in the recording medium 20 the compressed moving image data that is temporarily stored in the moving image buffer area on the DRAM 15. In the simultaneous recording and shooting mode, when the compressed moving image data is recorded, the compressed moving image data is added to a predetermined moving image file and recorded. Thus, moving images captured by still image shooting performed multiple times can be reproduced continuously by simply reproducing a single moving image file. Further, a new moving image file may be created at the timing that the shooting date changes or the recording size of the moving image file exceeds a predetermined size, and thereafter, moving images may be added to the new moving image file. Further, each moving image data to be added may be divided into chapters, and association information about how the still image file recorded in step S129 corresponds to the chapters of the moving image, may be added to the still image file or the moving image file and recorded.

Then, the still and moving image shooting processing is ended. In a case of continuing the simultaneous recording and shooting mode, the processing returns to step S102 to repeat the processing.

The foregoing shooting processing is executed so that, for example, in a case where the sub-image is to be displayed at the lower right 150 of the display unit 13 in landscape orientation shooting, the live view display is displayed and the image is recorded as illustrated in FIG. 5. In the case where the sub-image on the live view display is displayed at the lower right 150 of the display unit 13 at the time of landscape orientation shooting, the display position of the sub-image on the display unit 13 at the time of portrait orientation shooting does not change, and the sub-image is displayed at a position 151 or 152. On the other hand, on the moving image data to be recorded, the sub-image is combined at a position 154 at the time of landscape orientation shooting so that the positional relationship is the same as that of the position 150 on the live view display. At the time of portrait orientation shooting, the sub-image is recorded at a position 155 or 156, each of which is in the same direction as that of the position 151 or 152 on the live view display, respectively, and close to an end of the imaging area of the main image. As to the still images, the entire imaging area is recorded without rotation or addition of a margin regardless of the orientation.

In the foregoing way, the display position of the sub-image does not change each time the orientation of the imaging apparatus 10 is changed, and the sub-image is always positioned at an end of the imaging area of the main image on the recorded moving image, whereby the layout on the display and the appearance of the recorded moving image can be improved.

In the present exemplary embodiment, the still image captured by the main camera (imaging unit 17) and the moving image that has a different aspect ratio from the aspect ratio of the still image are recorded in response to the still image shooting command. The moving image is obtained by superimposing and combining the sub-moving image on the main moving image captured prior to the reception of the still image shooting command. Alternatively, in response to the still image shooting command, the captured image may be recorded, and the sub-image may be combined with the main image having a different aspect ratio from that of the captured image so that a combined image is obtained and the combined image is recorded as a still image. The dotted lines in the live view displays, main captured images, and moving image data in FIG. 5 are mere indication of the areas to be recorded in the case of landscape orientation and are neither displayed nor recorded.

The imaging apparatus 10 according to a second exemplary embodiment has the simultaneous recording and shooting mode as in the first exemplary embodiment and is capable of recording moving images of a certain period of time determined in a layout determination step of still image shooting such that the moving images are associated with captured still images. Further, as in the first exemplary embodiment, in the simultaneous recording and shooting mode, a photographer image captured by the sub-imaging unit 22 attached to the rear surface of the imaging apparatus 10 is superimposed on an object image captured by the imaging unit 17, and the superimposed image is displayed as a live view display and recorded as a moving image. At this time, unlike the first exemplary embodiment, the superimposing position (combining position) of data to be displayed is changed according to the settings and orientation of the imaging apparatus 10 such that the positional relationship between the main image and the sub-image remains the same with respect to the vertical direction of the imaging apparatus 10. That is to say, in the case where the sub-image is positioned at the lower right of the display screen when the imaging apparatus 10 is in landscape orientation, even if the orientation of the imaging apparatus 10 is changed to portrait orientation, the superimposing position is changed such that the sub-image is positioned at the lower right with respect to the vertical direction of the display screen when the imaging apparatus 10 is in portrait orientation. Further, the superimposing position (combining position) on the recorded moving image is changed according to the orientation of the imaging apparatus 10 such that the position of the sub-image on the main image on the live view display is the same as that on the moving image data to be recorded.

Figure 6:
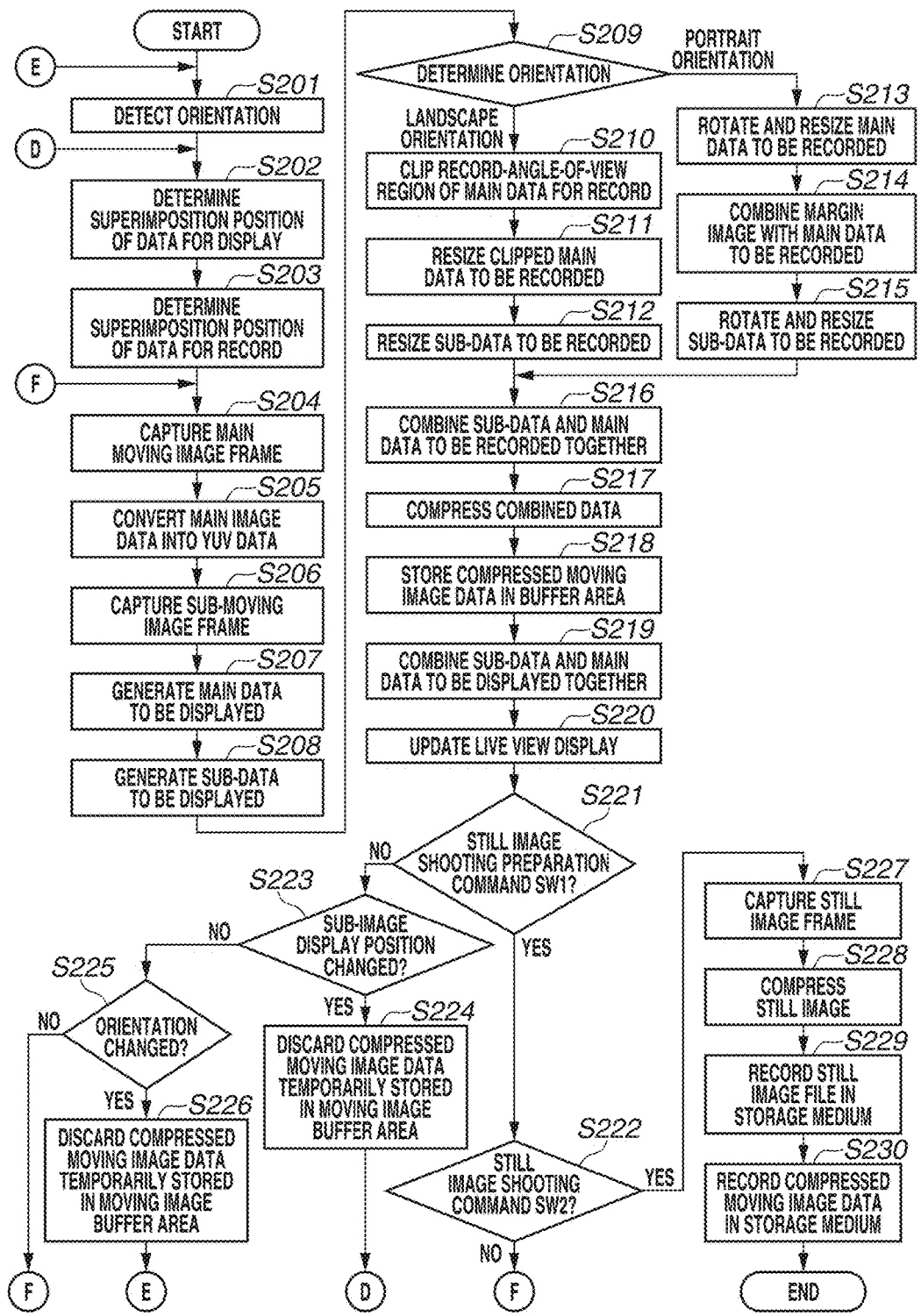
FIG. 6 is a flow chart illustrating the processing of an imaging apparatus in a simultaneous recording and shooting mode according to a second exemplary embodiment.
Figure 8:
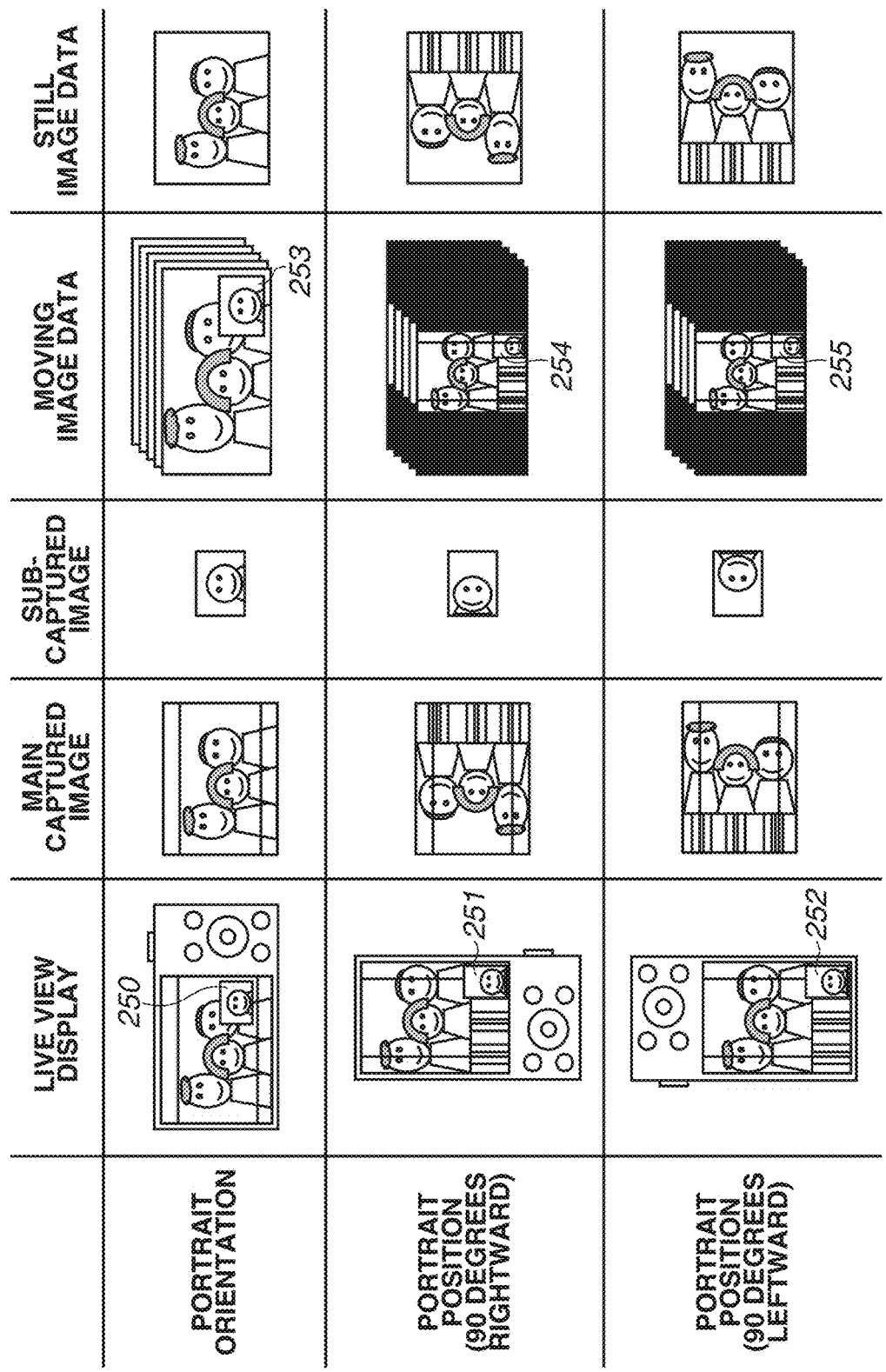
FIG. 8 illustrates examples of a live view display screen, a main captured image, a sub-captured image, moving image data, and still image data in landscape orientation shooting and portrait orientation shooting.

FIG. 6 is a flow chart illustrating operations of a shooting process that is executed by the imaging apparatus 10 in the simultaneous recording and shooting mode. The CPU 11 controls the respective units according to programs read from the ROM 12 to realize the operations illustrated in FIG. 6. FIG. 7 illustrates examples of the superimposing position of the sub-image on the live view displays and the superimposing position of the sub-image on the main image on the moving image data to be recorded in landscape orientation shooting and portrait orientation shooting (90 degrees rightward/90 degrees leftward). FIG. 8 illustrates examples of a main captured image, a sub-captured image, a live view display, moving image data, and still image data in landscape orientation shooting and portrait orientation shooting (90 degrees rightward/90 degrees leftward).

When a photographer operates the mode dial of the operation unit 14 to set the imaging apparatus 10 to the simultaneous recording and shooting mode, the flow illustrated in FIG. 6 is started.

In step S201, the CPU 11 causes the orientation detection unit 21 to detect the orientation of the imaging apparatus 10 and stores information about the detected current orientation of the imaging apparatus 10 in the DRAM 15.

In step S202, the CPU 11 determines the superimposing position (combining position) of the sub-image on the live view display on the display unit 13 based on the sub-image display position settings and the orientation of the imaging apparatus 10. That is to say, the CPU 11 determines the superimposing position (combining position) of the sub-data for display that is generated from an image captured by the sub-imaging unit 22, with respect to the main data for display that is generated from an image captured by the imaging unit 17.

In step S203, the CPU 11 determines the superimposing position (combining position) based on the sub-image display position settings and the orientation of the imaging apparatus 10. That is to say, the CPU 11 determines the superimposing position (combining position) of the sub-data for recording that is generated from an image captured by the sub-imaging unit 22, with respect to the main data for recording that is generated from an image captured by the imaging unit 17 in the moving image recording.

The following describes in detail the superimposing position of the sub-image on the live view display and the moving image in landscape orientation shooting and portrait orientation shooting (90 degrees rightward/90 degrees leftward) according to the present exemplary embodiment, with reference to FIG. 7. Dotted lines in the live view display and the moving images are merely for description of an area recorded in landscape orientation shooting, and are not displayed or recorded in the moving images.

In the simultaneous recording and shooting mode according to the present exemplary embodiment, the superimposing position of the sub-image on the live view display can be selected from the upper left 201, the upper right 202, the lower left 203, and the lower right 204 of the display unit 13 of the imaging apparatus 10 in normal position, i.e., landscape orientation. In the simultaneous recording and shooting mode, the imaging apparatus 10 captures a still image at the press of the shutter button, and the display unit 13 displays as a live view display the still image with an angle of view at an aspect ratio of 4:3. While the still image with the angle of view at the aspect ratio of 4:3 is displayed as a live view display, a HD moving image with an angle of view at an aspect ratio of 16:9 that is obtained by clipping upper and lower end areas of the image displayed as the live view display can be recorded together with the still image. Further, in the simultaneous recording and shooting mode, the sub-image is superimposed on the moving image for recording, whereas no sub-image is superimposed on the still image to be recorded and only the main image is recorded. For this reason, the sub-image is positioned within an inner area excluding upper and lower end portion areas 205, which are defined by the dotted lines and are not recorded in the moving image. In other words, the sub-image is positioned within an area of the shooting area on the live view display that is recorded as the moving image.

On the other hand, in portrait orientation shooting, the entire still image angle-of-view with an aspect ratio of 4:3 is rotated by 90 degrees and resized. Then, a margin image (in general, black image) is added to each of the right and left sides of the image, and then the image is recorded as a moving image. In other words, the entire area of the main image displayed as the live view display is recorded as a moving image. Thus, there is no such an area that is not recorded as a moving image, and the area including an end area 210 or 215, each of which is not recorded in the recorded moving image in landscape orientation shooting, is recorded. The sub-image is positioned at an end portion of the main image and displayed as the live view display, and also the sub-image is positioned on an area including the end area 210 or 215 and recorded in the recorded moving image.

In the present exemplary embodiment, the superimposing and display position of the sub-image on the display unit 13 is changed according to the orientation of the imaging apparatus 10 such that the sub-image is always positioned at an end of the area to be recorded as the moving image regardless of whether the imaging apparatus 10 is in landscape or portrait orientation and, furthermore, the sub-image is always positioned in the same direction as the vertical direction of the imaging apparatus 10. That is to way, in the case where the imaging apparatus 10 is rotated rightward by 90 degrees, the superimposing and display position is the upper left 206 of the imaging apparatus 10 rotated rightward by 90 degrees in the case where the superimposing and display position on the imaging apparatus 10 in landscape orientation is the upper left 201. The superimposing and display position is the upper right 207 in the case where the superimposing and display position on the imaging apparatus 10 in landscape orientation is the upper right 202. The superimposing and display position is the lower left 208 in the case where the superimposing and display position on the imaging apparatus 10 in landscape orientation is the lower left 203. The superimposing and display position is the lower right 209 in the case where the superimposing and display position on the imaging apparatus 10 in landscape orientation is the lower right 204. On the other hand, in the case where the imaging apparatus 10 is rotated leftward by 90 degrees, the superimposing and display position is the upper left 211 of the imaging apparatus 10 rotated leftward by 90 degrees in the case where the superimposing and display position on the imaging apparatus 10 in landscape orientation is the upper left 201. The superimposing and display position is the upper right 212 in the case where the superimposing and display position on the imaging apparatus 10 in landscape orientation is the upper right 202. The superimposing and display position is the lower left 213 in the case where the superimposing and display position on the imaging apparatus 10 in landscape orientation is the lower left 203. The superimposing and display position is the lower right 214 in the case where the superimposing and display position on the imaging apparatus 10 in landscape orientation is the lower right 204.

On the other hand, the superimposing position of the sub-image on the recorded moving image is the same as the superimposing position on the live view display. In other words, as in the case of the live view display, the superimposing position is determined according to the orientation of the imaging apparatus 10. The sub-image is superimposed and recorded at a position 216 in the case where the superimposing and display position on the live view display in landscape orientation is the upper left 201. The sub-image is superimposed and recorded at a position 217 in the case where the superimposing and display position on the live view display in landscape orientation is the upper right 202. The sub-image is superimposed and recorded at a position 218 in the case where the superimposing and display position on the live view display in landscape orientation is the lower left 203. The sub-image is superimposed and recorded at a position 219 in the case where the superimposing and display position on the live view display in landscape orientation is the lower right 204. In the case where the imaging apparatus 10 is rotated rightward by 90 degrees, the sub-image is superimposed and recorded at a position 220 in the case where the superimposing and display position is the position 206. The sub-image is superimposed and recorded at a position 221 in the case where the superimposing and display position is the position 207. The sub-image is superimposed and recorded at a position 222 in the case where the superimposing and display position is the position 208. The sub-image is superimposed and recorded at a position 223 in the case where the superimposing and display position is the position 209. In the case where the imaging apparatus 10 is rotated leftward by 90 degrees, the sub-image is superimposed and recorded at a position 224 in the case where the superimposing and display position is the position 211. The sub-image is superimposed and recorded at a position 225 in the case where the superimposing and display position is the position 212. The sub-image is superimposed and recorded at a position 226 in the case where the superimposing and display position is the position 213. The sub-image is superimposed and recorded at a position 227 in the case where the superimposing and display position is the position 214. That is to say, in portrait orientation shooting, as in the first exemplary embodiment, the superimposing position of the sub-image is changed to an end area of the main image, and the superimposing position of the sub-image on the main image is changed to the superimposing position rotated by an angle according to the orientation of the imaging apparatus 10.

As the foregoing describes, in the present exemplary embodiment, the sub-image is superimposed such that the superimposing position of the sub-image on the live view display is the same as that on the recorded moving image. Thus, the superimposing position of the sub-image on the main image in landscape orientation is changed from that in portrait orientation. In landscape orientation, the sub-image is superimposed within an area excluding the end area that is not recorded in the recorded moving image, whereas in portrait orientation, the sub-image is positioned within an area including the end area. Therefore, in landscape orientation, the sub-image is positioned apart from the end portion of the main image along the shorter side direction by a predetermined distance according to the end area 210 or 215.

Steps S204 to S230 are similar to steps S104 to S130 in the first exemplary embodiment, so description thereof is omitted.

The foregoing shooting processing is executed so that in portrait orientation shooting, the sub-image is positioned at an end of an area to be recorded such that the vertical direction with respect to the screen is the same as the vertical direction of the live view display in landscape orientation shooting, as illustrated in FIG. 8. Specifically, in the case where the sub-image is displayed at the lower right 250 of the display unit 13, the sub-image is displayed at a position 251 or 252. On the other hand, on the moving image data to be recorded, the sub-image is recorded at positions 253, 254, and 255 such that the positional relationships are the same as those of the positions 250, 251, and 252 on the live view display, respectively. Lines in the live view displays, the main captured images, and the moving image data in FIG. 8 are merely for specifying an area to be recorded in landscape orientation and are not displayed or recorded.

In the foregoing way, the display position of the sub-image is re-positioned in response to a change in orientation of the imaging apparatus 10 such that the display position of the sub-image is always in the same direction as the vertical direction of the imaging apparatus 10 and at an end of the imaging area on the moving image to be recorded, whereby the layout on the display and the appearance of the recorded moving image can be improved.

Other Embodiments

While the foregoing describes suitable exemplary embodiments of the present invention, it is to be understood that the exemplary embodiments are not intended to limit the scope of the invention and can be modified and changed in various ways within the spirit of the invention.

While the foregoing exemplary embodiments describe as examples the imaging apparatus to which the present invention is applied, the present invention is also applicable to a mobile phone including a camera or an electronic device such as a portable game machine. Further, instead of realizing the foregoing functions of the exemplary embodiments with a single apparatus, the operations of the imaging apparatus may be realized by a system in which multiple apparatuses such as an imaging apparatus including multiple imaging units and an orientation detection unit, a display apparatus including a display unit, and a control apparatus including a CPU, a ROM, and a DRAM are connected together. Further, some of the foregoing exemplary embodiments may be combined and implemented as appropriate.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-269684 filed Dec. 26, 2013, which is hereby incorporated by reference herein in its entirety.

What is claimed is:

1. An imaging apparatus comprising:
   a first imaging unit;
   a second imaging unit;
   an orientation detection unit configured to detect an orientation of the imaging apparatus;
   a combining unit configured to generate a combined image by combining an image captured by the second imaging unit with an image captured by the first imaging unit;
   a recording control unit configured to control the recording of an image performed by the recording unit; and
   a control unit configured to control the generating the combined image performed by the combining unit and the recording of the combined image performed by the recording unit,
   wherein the control unit changes a combining position where the image captured by the second imaging unit is combined with the image captured by the first imaging unit according to the orientation of the imaging apparatus detected by the orientation detection unit,
   wherein in a case where the orientation of the imaging apparatus detected by the orientation detection unit is a first orientation, the control unit performs control such that the combining unit generates the combined image by combining the image captured by the second unit with a rotated image which the image captured by the first imaging unit is rotated, and
   wherein the control unit performs control the recording such that the recording unit records the combined image having a predetermined image size, and in a case where the image captured by the first imaging unit is rotated, predetermined data is added to the rotated image, and the recording unit records the combined image that includes the rotated image to which the predetermined data is added.

2. The imaging apparatus according to claim 1, further comprising a display control unit configured to display on a display unit the combined image.

3. The imaging apparatus according to claim 1, wherein in the case where the orientation of the imaging apparatus detected by the orientation detection unit is the first orientation, the control unit controls the combining position such that the image captured by the second imaging unit is combined at a position on an area where the predetermined data is not added.

4. The imaging apparatus according to claim 1, wherein the control unit performs control the recording such that in a case where the imaging apparatus is in a first orientation, the recording unit records in the recording medium the combined image that includes a predetermined end area of the image captured by the first imaging unit, and in a case where the imaging apparatus is in a second orientation, the recording unit records in the recording medium the combined image that does not include the predetermined end area of the image captured by the first imaging unit.

5. The imaging apparatus according to claim 4, wherein the control unit is configured to perform control such that, in a case where the orientation of the imaging apparatus detected by the orientation detection unit is a landscape orientation in which the imaging apparatus is not rotated around an optical axis, the recording unit records the combined image that does not include a predetermined end portion of the image captured by the first imaging unit, whereas in a case where the orientation of the imaging apparatus detected by the orientation detection unit is a portrait orientation in which the imaging apparatus is rotated around the optical axis by 90 degrees, the recording unit records the combined image that includes the predetermined end area.

6. The imaging apparatus according to claim 5, wherein in the case where the image is rotated, the control unit adds the predetermined data outside each of two opposite sides of the rotated image.

7. The imaging apparatus according to claim 1, wherein the control unit controls the combining position such that the combining position is closer to an end portion of the image captured by the first imaging unit in a case where the orientation of the imaging apparatus detected by the orientation detection unit is a first orientation, than in a case where the orientation of the imaging apparatus detected by the orientation detection unit is a second orientation.

8. An imaging apparatus comprising:
   a first imaging unit;
   a second imaging unit;
   an orientation detection unit configured to detect an orientation of the imaging apparatus;
   a combining unit configured to generate a combined image by combining an image captured by the second imaging unit with an image captured by the first imaging unit;

a recording control unit configured to control the recording of an image that is performed by the recording unit, and a control unit configured to control the generating the combined image performed by the combining unit and the recording of the combined image performed by the recording unit, wherein the control unit changes a combining position where the image captured by the second imaging unit is combined with the image captured by the first imaging unit according to the orientation of the imaging apparatus detected by the orientation detection unit, and wherein the control unit performs control such that the recording unit records in the recording medium a still image captured by the first imaging unit in response to a still image shooting instruction and also records a moving image generated by combining the image captured by the second imaging unit with the image captured by the first imaging unit together.

9. A method of controlling an imaging apparatus including a first imaging unit and a second imaging unit, the method comprising:

determining an orientation of the imaging apparatus; and generating a combined image by combining an image captured by the second imaging unit with an image captured by the first imaging unit, recording in a recording medium the combined image the combined image;

changing a position combining where the image captured by the second imaging unit is combined with the image captured by the first imaging unit according to the orientation of the imaging apparatus, and recording in the recording medium such that a still image captured in the first imaging unit is recorded in response to a still image shooting instruction and recording a moving image generated by combining the image captured by the second imaging unit with the first imaging unit together.

10. A non-transitory computer-readable storage medium storing a program for causing a computer to execute the method of controlling an imaging apparatus according to claim 9.

* * * * *